Patented Jan. 13, 1953

2,625,540

UNITED STATES PATENT OFFICE 2,625,540

WOOD ROSIN REFINING PROCESS

Chester C. Crawford, Bartlesville, Okla., assignor to Phillips Petroleum Company, a corporation of Delaware No Drawing. Application August 18, 1947, Serial No. 769,312

11 Claims. (Cl. 260—108)

This invention relates to the refining of crude rosin. In one aspect it pertains to an improved solvent extraction process whereby valuable light-colored rosin is obtained in increased yield from crude rosin. In another aspect the present invention relates to an improved solvent having a high degree of selectivity for the light-colored rosin in preference to the less valuable color bodies present in crude wood rosin.

In the art of recovering valuable resins and rosin from waste wood products, it is conventional practice first to treat the comminuted wood chips or the like with a suitable solvent, such as benzene. Upon evaporation of the solvent from the resulting extract a crude grade of wood rosin is obtained. This material is then dissolved in a petroleum naphtha fraction. In order to separate the desirable lighter-colored rosin from the darker-colored components it is necessary either to filter the naphtha solution through charcoal, Fuller's earth, or the like, or to add a second solvent which is relatively immiscible with the naphtha and which selectively dissolves the darker-colored color bodies. One example of such a selective solvent is furfural. After treating the naphtha solution with furfural, for example, usually about 7–10 weight per cent based on the crude rosin, two liquid phases are formed, namely a furfural phase, containing the more highly colored bodies, and a naphtha phase containing the lighter-colored rosin. The highly colored resinous bodies are recovered by removing the furfural from the furfural phase. The naphtha phase is treated with an additional quantity of furfural, usually about 40 weight per cent based on the crude rosin. From the furfural layer obtained after this second treatment there is recovered a second type of colored resin which is of less commercial value than the resin obtained from the first furfural phase or the rosin obtained from the naphtha phase. The naphtha phase is subjected to an evaporation process to recover the more valuable product in the form of a light-colored rosin.

Because of the greater commercial value of the rosin, as compared with either of the resins obtained from the above mentioned furfural extraction steps, it is desirable to increase the yield of the rosin at the expense of the resins. Also, it is desirable to produce a rosin of as light color as possible without too great a sacrifice of rosin yield.

I have now found that these and other desirable results may be obtained when the crude rosin is refined in accordance with the process of my invention. Although the preferred naphtha solvent of the prior art has been a petroleum fraction of the type which is obtained by fractional distillation of a natural gasoline or crude oil naphtha, the use of these solvents necessitates additional treatment of the rosin solution, such as filtration or the two furfural extraction steps outlined above, in order to separate the light-colored rosin from the darker-colored resins. I have discovered that if, instead of the aforementioned naphtha fraction of naturally occurring petroleum products, there is employed a specific type of synthetic hydrocarbon solvent manufactured by certain recently developed processes, the rosin refining process may be carried out in a vastly improved and simplified manner.

One object of this invention is to provide an improved process for the refining of rosin.

Another object is to provide an improved solvent for solvent refining of rosin.

Still another object is to provide an economical method for improving the color and yield of valuable wood rosin.

Other objects will be obvious to those skilled in the art from the accompanying disclosure and discussion.

The improved hydrocarbon solvents of my invention are derived from certain well known synthetic processes. Such processes include, for example, alkylation of alkylatable paraffinic materials with olefinic materials; the hydrogenation of olefinic polymers formed by polymerizing low molecular weight olefins, or isomerization of straight chain or less highly branched paraffins to more highly branched structure or by separation of the highly branched paraffinic hydrocarbons from naturally occurring petroleum products. My preferred solvent is obtained from the products of the well known hydrofluoric or sulfuric acid catalyzed alkylation process wherein an isoparaffin, such as isobutane, is reacted with an olefin, such as a butylene. Paraffin-olefin alkylation, using either hydrofluoric acid or sulfuric acid as a catalyst, is well known and has been described in many publications. My solvent may have a boiling range of from about 150 to about 350° F., or higher, however, I prefer it to boil in the range of about 205 to about 235° F. Despite the fact that this material does not appear to differ substantially in physical properties, with the exception of aniline point, from the conventional solvents of the prior art, I have made the surprising discovery that my preferred solvents have definitely superior selectivity with respect to the lighter-colored components of the crude wood rosin. This selectivity is so marked, in fact, that it is possible to eliminate one of the furfural extraction steps when using my synthetically prepared isoparaffinic hydrocarbon solvent. A synthetically prepared isoparaffinic hydrocarbon solvent, such as a selected fraction taken from the product of a hydrofluoric acid alkylation process, such as mentioned above, and having the properties shown by Sample 1 and Sample 2 in the following table, is very satisfactory for my purpose. Also given in the following table are the properties of a conventional solvent for use in refining wood rosin.

|  | Conventional Solvent | Sample 1—Isoparaffinic Product from HF Alkylation | Sample 2—Isoparaffinic Product from HF Alkylation |
|---|---|---|---|
| Index of Refraction at 20° C | 1.400 | 1.394 | 1.394 |
| Kauri Butanol: | | | |
| Value, ml | 30.5 | 26.9 | 26.5 |
| Solvent Power, percent | 6 | 1 | 1 |
| API Gravity at 60° F | 66.5 | 70.0 | 69.8 |
| Aniline Point, °F | 149 | 169 | 168 |
| Furfural Solubility, grams furfural per 100 grams hydrocarbon | 5.4 | 4.7 | 5.0 |
| ASTM Distillation, °F.: | | | |
| FD | 200 | 204 | 200 |
| 5* | 208 | 208 | 204 |
| 10* | 210 | 211 | 211 |
| 30* | 215 | 214 | 217 |
| 50* | 220 | 217 | 222 |
| 70* | 226 | 220 | 227 |
| 90* | 238 | 225 | 236 |
| 95* | 246 | 230 | 241 |
| DP | 260 | 236 | 247 |

*Corrected to percent evap. at 29.9 in. Hg.

I have found by use of my new solvent in rosin refining a saving of furfural in the order of 13 to 30 weight per cent may be realized, as well as an increase in the yield of both the useful resin and the refined rosin. It is preferred to use only one furfural extraction step in my process, but two or more such steps may be used, if desired. In employing more than one furfural extraction step the yield of the rosin produced is somewhat lower, but the rosin is improved in color over that when only one furfural extraction is employed. In some cases it is possible to eliminate the furfural extraction step altogether due to the selective solvent action of solvent for the light-colored rosin.

According to my invention the crude wood rosin is dissolved in my isoparaffinic hydrocarbon solvent. The amount of solvent used will depend considerably upon the temperature employed, and upon the source of the rosin, but in any event it is desirable to use a minimum quantity of solvent in order to get the desired results. The process of my invention may be conducted satisfactorily by dissolving one part by weight of rosin in from 1 to 20 parts by weight of solvent. However, I am not limited to this range, as in some cases it may be desirable to use more or less solvent per part of rosin than shown, depending upon several factors, such as the specifications of the finished products, temperature of operation and the like. The temperature at which the rosin is dissolved in my solvent may range from about 100° F. or lower to the reflux temperature of the solvent. I prefer, however, to use a temperature in the range of about 100 to about 250° F. After the amount of rosin has been dissolved in the selected isoparaffinic solvent, the rosin solution plus undissolved rosin, if any, is treated with a solvent, such as furfural, aniline, phenols, ethylene glycols, etc., which is substantially immiscible in my selective solvent and is a selective solvent for the darker-colored bodies of the crude rosin. The amount of the immiscible solvent used may vary between wide limits depending on the specifications of the desired products, the temperature used, the specific solvent used and the like, but in general the solvent is used in an amount from about 20 to about 50 weight per cent, based on the crude rosin originally charged. It is desirable to use as little of the solvents as possible to get the desired results. However, I usually prefer to use from about 25 to 40 weight per cent of solvent, based on the crude rosin. The temperature at which the immiscible solvent contacts the rosin solution may be in the order of 100 to 175° F., but I prefer to use a temperature in the range of about 110 to 150° F. After contacting the furfural or immiscible solvent with the hydrocarbon solvent-rosin solution, the mixture is allowed to stand and it separates into a furfural phase and a hydrocarbon solvent phase. The furfural and hydrocarbon solvent are removed by any suitable means such as distillation and the respective product recovered. Any suitable vessel or vessels with necessary accessories such as condensers, distillation means, and the like may be used in my process.

While I am not absolutely certain why my preferred synthetic hydrocarbon solvents are superior to the conventional naturally-occurring naphtha solvents, it appears probable that the solvent selectivity of the former is due, in part at least, to the highly branched structure of the hydrocarbon chain. The hydrocarbons present in my preferred solvent are chiefly the highly branched paraffins, such as, for example, isooctanes. By highly branched paraffins I mean paraffin hydrocarbons which have at least two branched chains attached to one or more carbon atoms present in the principal chain of the paraffin hydrocarbon molecule as for example, 2,3-dimethylpentane, 2,2,4-trimethylpentane, 2,3,4-trimethylpentane and the like. Other types of hydrocarbons, such as aromatics, naphthenes, olefins and straight chain paraffins are substantially absent. My preferred solvents are further characterized by having a very high aniline point (above about 165° F.), a low kauri butanol value (below about 30 ml.), and a low solvency for furfural and like selective solvents.

While the description of this invention has been confined to a batch operation, the rosin refining by solvent extraction is equally applicable to a continuous process. It is understood that numerous variations may be introduced, both in operating conditions and amount of solvents used, without departing from the scope of the disclosure. It will be evident to those skilled in the art that my invention will be applicable to the refining of rosin esters, rosin alcohols, esters of rosin alcohols, as well as to crude wood rosin which I have discussed throughout the disclosure.

In the following examples, crude "FF" grade wood rosin and the hydrocarbon solvent were mixed in the proportions required for a 25 per cent solution. The mixture was stirred for one hour at reflux temperature in a flask equipped with an external heater and a reflux condenser. After the addition of furfural the mixture was stirred for an additional hour at 100° F., then cooled to room temperature and the furfural and hydrocarbon layers allowed to separate. Vacuum distillation was employed for the removal of the solvents from the dissolved resins or rosin. Properties of the rosin and resins were determined by standard test methods in use in the industry.

*Example I*

The above described procedure was carried out using as solvent a 200–263° F. boiling range naphtha cut currently in commercial use as a rosin refining solvent. The first addition of furfural was made using 7 per cent by weight of furfural base on the rosin, in accordance with commercial practice. After separation of the hydrocarbon and furfural layers the latter was distilled under vacuum, yielding a resin fraction amounting to 20 per cent by weight based on the crude rosin.

A second furfural extraction was then carried out on the hydrocarbon layer, using 40 per cent by weight of furfural based on the rosin. The resin recovered upon vacuum distillation of the furfural layer amounted to a yield of 12 per cent by weight based on the rosin. This resin fraction is the least valuable product, and its elimination or a reduction in the amount formed is greatly to be desired.

Distillation of the remaining hydrocarbon layer yielded a refined rosin, of satisfactory color, amounting to 68 per cent by weight.

*Example II*

The procedure described in Example I was repeated, using as solvent the synthetic highly branched isoparaffinic hydrocarbons of this invention, a 200–230° F. fraction being employed in this instance. The yield of resin resulting from the first furfural extraction (7 per cent furfural by weight) was 22 per cent. The second furfural extraction (40 per cent by weight) yielded 11 per cent by weight of the least valuable resin fraction, representing a reduction of 8⅓ per cent in the yield of this product. The yield of refined rosin was 67 per cent by weight and the rosin was of significantly better color than that produced in Example I.

*Example III*

The procedure of Example II was repeated, except that the amount of furfural employed in the second furfural extraction was reduced from 40 per cent to 25 per cent. The yield of resin from the first furfural extraction was of course the same as in Example II, 22 per cent, but the yield of the less valuable resin was reduced to 9 per cent by weight of total products. The refined rosin yield was increased to 69 per cent, with a color equal to that obtained in Example I. Thus compared with Example I, the amount of furfural used was reduced by almost 32 per cent, the production of low grade resin was reduced by 25 per cent, and the yields of both the useful resin fraction and the refined rosin were increased.

*Example IV*

The same procedure was again followed, except that the solvent was of somewhat wider boiling range than that employed in Example II, and the amount of furfural used in the first furfural extraction step was increased to 40 per cent. This resulted in a yield of 28 per cent of resin of good quality. The second furfural extraction was eliminated, and the hydrocarbon phase yielded 72 per cent of rosin of good color. Thus the present invention provides a means of reducing the amount of furfural by 15 per cent while at the same time increasing the yield of good quality rosin by some 6 per cent.

As will be evident to those skilled in the art, various modifications of this invention can be made, or followed, in the light of the foregoing disclosure and discussion, without departing from the scope or spirit of the disclosure or from the scope of the claims.

I claim:

1. A continuous process for refining wood rosin which comprises dissolving one part of said rosin in from 1 to 20 parts by weight of a highly branched paraffinic hydrocarbon solvent prepared by the alkylation of isobutane with butene, said solvent boiling in the range between 205 and 235° F., and having an aniline point above 165° F. and a kauri butanol value under 30; treating the resulting solution with furfural, whereby the furfural removes color bodies from the solution, and recovering the rosin from the treated solution.

2. A process for refining wood rosin which comprises dissolving one part of said rosin in from 1 to 20 parts by weight of a highly branched paraffinic hydrocarbon solvent prepared by alkylating isobutane with a butene, said solvent boiling in the range between 150 and 350° F., and having an aniline point above 165° F. and a kauri butanol value under 30; treating the resulting solution with furfural, whereby the furfural removes color bodies from the solution and recovering the rosin from the treated solution.

3. A process for refining a material selected from the group consisting of rosins, rosin esters, rosin alcohol, and esters of rosin alcohols, which comprises dissolving the material in a highly branched paraffinic solvent and prepared by alkylating isobutane with a low molecular weight olefin, said solvent boiling in the range between 150 and 350° F., and having an aniline point above 165° F. and a kauri butanol value under 30, separating undissolved constituents from the solution and removing a solvent from the dissolved rosin.

4. A process for refining wood rosin, which comprises dissolving one part of said rosin in from 1 to 20 parts by weight of iso-octane, treating the resulting solution with furfural, whereby the furfural removes color bodies from said solution, and recovering the rosin from the treated iso-octane-rosin solution.

5. A process for refining a material selected from the group consisting of rosins, rosin esters, rosin alcohols and esters of rosin alcohols, which comprises dissolving the material in iso-octane, separating undissolved constituents from the solution and removing the iso-octane from the dissolved rosin.

6. In refining colored rosin to obtain lighter colored rosin, the steps of treating the rosin with isooctane solvent whereby the light colored portion of the rosin dissolves, leaving darker colored parts undissolved and separating the solution and the undissolved parts from each other.

7. An improved method for refining colored rosin to obtain lighter colored rosin, which comprises the steps of contacting a colored rosin and a liquid paraffinic hydrocarbon solvent consisting essentially of at least one branched chain paraffin hydrocarbon having between 7 and 8 carbon atoms per molecule and each said hydrocarbon containing at least four methyl groups, dissolving in said liquid paraffinic hydrocarbon solvent such portion of said colored rosin as is soluble therein, and recovering a lighter colored rosin from said hydrocarbon solvent.

8. A process for refining colored rosin to obtain lighter colored rosin, which comprises the steps of contacting a colored rosin and a liquid paraffinic hydrocarbon solvent consisting essentially of at least one branched chain paraffin hydrocarbon boiling in the range between 150 and 350° F. and each said hydrocarbon having at least two side chains attached to carbon atoms present in the basic chain of the molecular structure of the hydrocarbon, said solvent having an aniline point above 165° F. and a kauri butanol value under 30, dissolving in said liquid paraffinic hydrocarbon solvent such portion of said colored rosin as is soluble therein, and recovering a lighter colored rosin from said hydrocarbon solvent.

9. The process of claim 8, wherein said hydrocarbon solvent boils in the range between 205 and 235° F.

10. A process for refining a material selected from the group consisting of rosins, rosin esters, rosin alcohol, and esters of rosin alcohols, which comprises the steps of contacting said material and a liquid paraffinic hydrocarbon solvent consisting essentially of at least one branched chain paraffin hydrocarbon boiling in the range between 150 and 350° F. and each said hydrocarbon having at least 2 side chains attached to carbon atoms present in the basic chain of the molecular structure of the hydrocarbon, said solvent having an aniline point above 165° F. and a kauri butanol value under 30, dissolving in said liquid paraffinic hydrocarbon solvent such portion of said material as is soluble therein, separating undissolved constituents from said solution, and removing said solvent from the dissolved material.

11. The process of claim 10 wherein said hydrocarbon solvent boils in the range between 205 and 235° F.

CHESTER C. CRAWFORD.

REFERENCES CITED

The following references are of record in the file of this patent:

UNITED STATES PATENTS

| Number | Name | Date |
|---|---|---|
| 2,209,545 | Toby | July 30, 1940 |
| 2,306,455 | Martin | Dec. 29, 1942 |